(No Model.)
P. NOLAN.
Railroad Track Gage.
No. 242,357. Patented May 31, 1881.
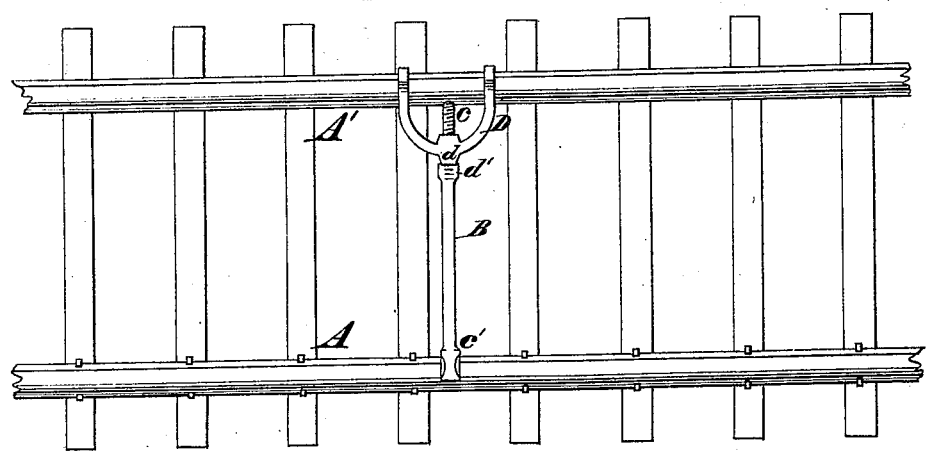
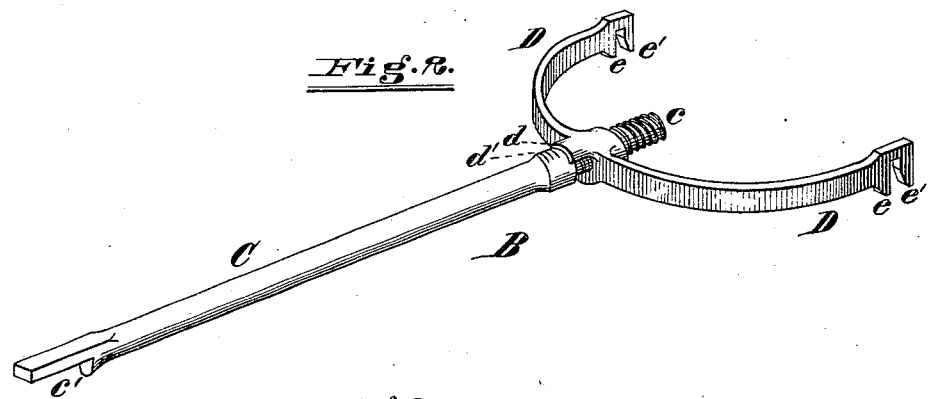
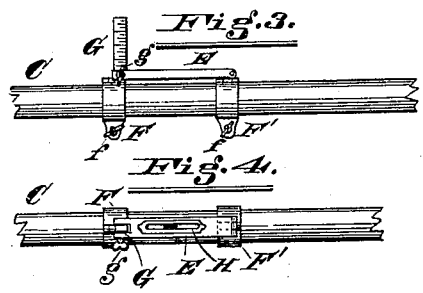
Attest
Jno. E. Jones
Eugene L. Pinkous
Inventor
Patrick Nolan,
by Wood & Boyd,
his Attorneys

UNITED STATES PATENT OFFICE.

PATRICK NOLAN, OF ROCKWOOD, ASSIGNOR OF ONE-HALF TO SAMUEL BENNETT, OF CHATTANOOGA, TENNESSEE.

RAILROAD-TRACK GAGE.

SPECIFICATION forming part of Letters Patent No. 242,357, dated May 31, 1881.

Application filed February 25, 1881. (No model.)

*To all whom it may concern:*

Be it known that I, PATRICK NOLAN, a subject of the Queen of Great Britian, of Rockwood, in the county of Roane and State of Tennessee, have invented certain new and useful Improvements in Railroad-Track Gages, of which the following is a specification.

This invention relates to that class of railroad-track gages which are composed of a bifurcated bar connected with one end of a gage-rod, the bifurcated arm having shoulders to rest against one rail, and the gage-rod having a shoulder to rest against the opposite rail.

This class of gages as heretofore constructed have been difficult to adjust, and after adjustment are liable to accidental displacement or their adjusting devices to slip.

The object of my invention is to so connect the bifurcated bar with the gage-rod that the gage may be lengthened or shortened by simply rotating or turning the gage-rod. This is accomplished by the simple construction and arrangement of parts illustrated in the accompanying drawings, in which—

Figure 1 is a plan view of my invention as used in laying railroad-rails. Fig. 2 is a perspective view of my improvement. Fig. 3 is a broken elevation of the gage-rod, showing the adjustable pivoted level secured thereon. Fig. 4 is a plan view of the same.

A A' represent ordinary T-rails.

B represents the gage.

C represents the gage-rod, having a shoulder, c', which abuts against one of the rails, A.

D represents a bifurcated bar, having notches e to engage over one of the rails, A, as shown in Fig. 1. Instead of the notches e the ends of the bifurcated bar may have a similar shoulder to that on the opposite end of the gage. The gage-rod C and the bifurcated arm D are adjustably united or connected by means of the screw-threaded end c of the rod passing through and engaging a threaded eye or opening in the bar in such manner, as shown, that the length of the gage can be conveniently, rapidly, and accurately adjusted by simply rotating or turning the gage-rod C in the threaded eye or opening in the bifurcated bar.

d' represents gage-marks to indicate the length of the gage or degree of adjustment. F F' represent hinged circular clamps or collars, which are adjusted around the rod C, and secured in position by thumb-screw bolts f.

E represents a common spirit-level. It is pivoted at one end to collar F'. The other end is made with an open mortise or slots, through which projects a gage, G, on which gage is placed scale-marks to indicate the angle of inclination of the level and of the track-gage. The level E is secured at the desired angle of inclination by means of the set-screw g. It is desirable to have the screw-threads a pitch of one-eighth of an inch, so that one complete revolution of the rod C will lengthen or shorten the length of the gage one-eighth of an inch, which increase between the rails is usually allowed for all curves over two degrees.

It is evident that the increase in the length of the rod can be made gradual by turning the rod only one part of a revolution.

My track-gage may be made of wood or metal. When made of metal the rod C should be made hollow, so as to save weight of metal and to prevent undue contraction and expansion of the material.

I claim—

1. A railroad-track gage consisting of the shouldered gage-rod C and the bifurcated shouldered bar D, connected and united by a screw-threaded end of one engaging a screw-threaded eye or opening of the other, substantially as described, for the purposes set forth.

2. A railway-track gage combining in its structure a gage-rod, C, provided with two clamping-collars, F F', one of said collars carrying an attached vertically-projecting scale or gage, G, and the other carrying a hinged level, E, the said members being arranged in the described relation substantially as and for the purpose set forth.

In testimony whereof I have hereunto set my hand in the presence of two subscribing witnesses.

PATRICK NOLAN.

Witnesses:
JNO. E. JONES,
EUGENE L. FIRNKOESS.